(No Model.)
C. D. STEVENS.
WHEEL.
No. 601,802. Patented Apr. 5, 1898.
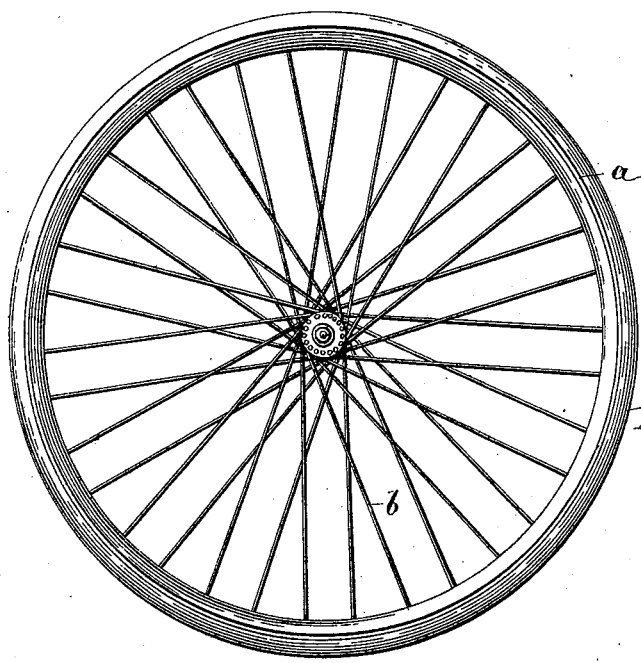
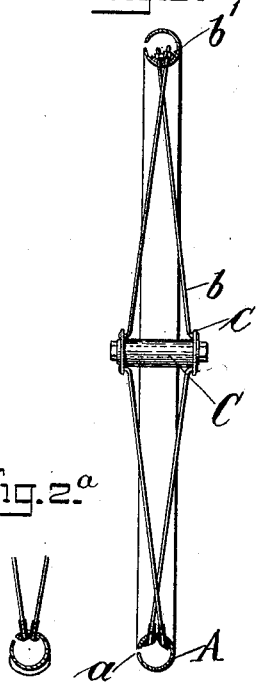
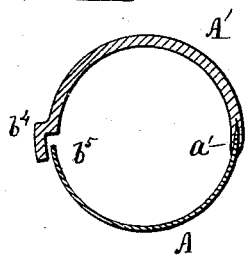 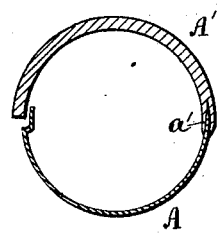 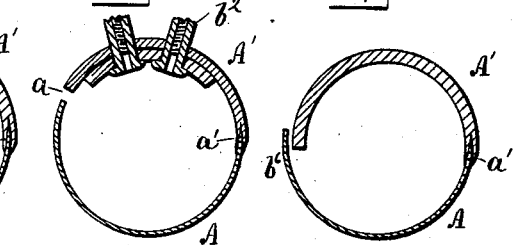
WITNESSES:
Fr. N. Roehrich.
M. F. Boyle
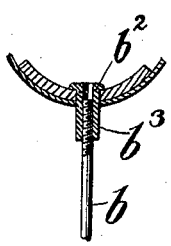
INVENTOR
Charles D. Stevens
BY
Thomas Drew Stetson
ATTORNEY
THE NORRIS PETERS CO., PHOTO-LITHO., WASHINGTON, D. C.

UNITED STATES PATENT OFFICE.

CHARLES D. STEVENS, OF NEW YORK, N. Y.

WHEEL.

SPECIFICATION forming part of Letters Patent No. 601,802, dated April 5, 1898.

Application filed February 27, 1897. Serial No. 625,336. (No model.)

*To all whom it may concern:*

Be it known that I, CHARLES D. STEVENS, a citizen of the United States, residing in the city of New York, in the State of New York, have invented a certain new and useful Improvement in Bicycle and other Wheels, of which the following is a specification.

The present invention has reference to bicycle and other wheels, and has for its principal objects the construction of a wheel that will not only be exceedingly simple and durable in construction, but will possess a cushion effect to a very high degree.

With these ends in view my invention consists in the improved construction hereinafter described and claimed.

In the drawings accompanying this specification, Figure 1 is a side view of a wheel embodying my invention. Fig. 2 is a central vertical section illustrating the arrangement of the spokes. Fig. 2ª is a corresponding section of a portion having a rubber coating on the tread and with the junctions of the spokes with the rim differently arranged. The remaining figures are on a larger scale. Figs. 3 to 6, inclusive, are cross-sectional views of various constructions of tubular rims within the scope of my invention. Fig. 7 is a cross-section of a portion showing a modified connection of one of the spokes with the tubular rim.

Like letters of reference indicate corresponding parts in all the figures where they appear.

The outer portion of the wheel is represented by an annular metal tube A A', preferably of spring-steel, which performs the functions both of the rim and tread of a wheel. To secure a considerable cushioning effect, the tube A A' is divided or split at one side throughout its entire length. The inside part A of this tubular rim has perforations for the passage of the outer ends of the spokes $b$, which may be of wire, their inner ends being in engagement with the flanges $c$ of the hub C. The inner end of each wire spoke is headed and connected with the flange by a sharp bend in the long-approved manner. The spokes are also secured to the tubular rim by nuts $b'$ within the same, engaging the threaded spoke ends. These may be also of an ordinary form, as shown. The rim may be held with its joint sprung open to permit of inserting a tool suitable for adjusting the nuts.

A reinforcing-band or a series of washers may be interposed between the nuts and the interior of the rim A.

The rim is made in two parts A and A', united along the line $a'$ by welding. The adjoining edges should be matched by letting one a little into the other. This allows the rim to be more easily formed by bending each part than by bending the entire rim. The distortion of the metal in compressing the inner part and stretching the outer part is greatly lessened. The inner part A may be thicker than the outer part A', and it will usually be preferable to make them of different qualities of metal. It is important that the outer part A' be highly elastic. It may be considerably higher steel than that of the inner part A.

As thus constructed, the wheel will be capable of much cushioning action and yet be otherwise comparatively rigid. The tread of the tubular rim, on account of the elastic yielding, will wear but little.

The improved wheel is serviceable not only on cycles of all kinds and grades, but also for use in connection with sulkies and other light racing-rigs.

Modifications may be made without departing from the principle or sacrificing the advantages of the invention. The construction of the rim at points contiguous to the division may widely vary. Thus in Fig. 3 the edge portion of the rim-tread has an inner shoulder-bend $b^4$, which underlaps and is guided along the other edge portion $b^5$ when the rim undergoes compression. In Fig. 4 the arrangement in the preceding figure is reversed. In Fig. 5 the tread portion forms a simple overlap, as indicated at $b^6$. The tread-surface proper may have a rubber or other yielding facing cemented or otherwise applied thereto. Fig. 2ª shows such a facing.

The means for connecting the spokes to the tube A may include threaded sleeves $b^2$ at the inner side of the tube and are adapted to receive and engage the spoke ends through the application of a suitable tool. (See Figs. 2 and 7.)

Parts of the invention can be used without the whole. I can make the entire rim A A' in one piece, either lining the inner side with an additional plate or leaving the metal there without any special reinforce. When it is made, as I prefer, in two parts separately formed and bent, they may be joined at a' by brazing instead of welding.

The location of the circumferential split at one side is important, because it allows a greater elastic yielding of the rim than is possible if the joint is at the periphery and because it leaves the periphery intact to serve as a bearing-surface on the ground. I attach importance to the matching of the edges adjacent to the circumferential split, because it excludes dirt and allows the joint to open and close elastically.

I claim as my invention—

1. The combination in a wheel, of a rim comprising a spring split circular tube A A', the portion A being independent and of a differing material from the part A', and constituting the tread proper, substantially as described.

2. The combination in a wheel, of a rim comprising a spring split circular tube A A', the portion A being independent and of spring metal and united at one side only to the portion A', substantially as herein specified.

3. The combination in a wheel, of a rim comprising a spring split circular tube A A', the free lapping portion of which is shouldered for the reception of the other edge portion, substantially as specified.

In testimony that I claim the invention above set forth I affix my signature in presence of two witnesses.

CHARLES D. STEVENS.

Witnesses:
WILLIAM BROWN,
M. F. BOYLE.